(No Model.)
R. S. WIESENFELD.
SOFT TREAD HORSESHOE.
No. 589,488. Patented Sept. 7, 1897.
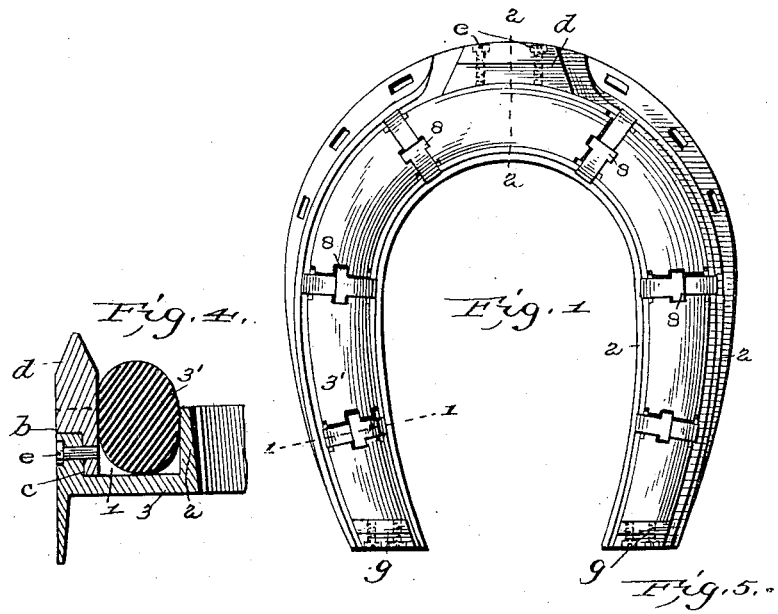
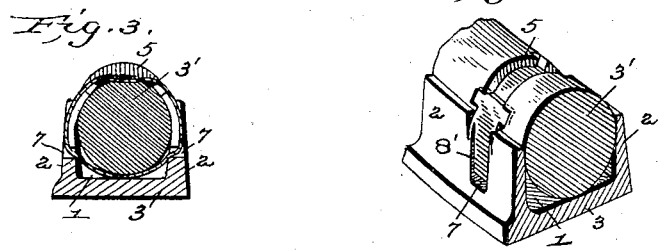
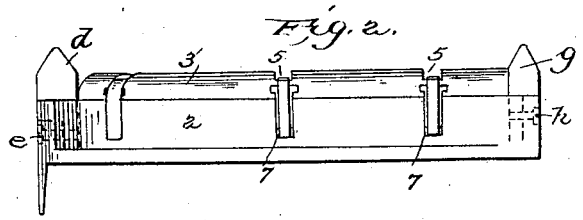
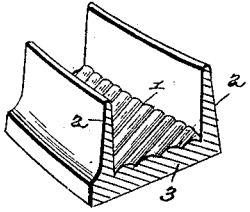
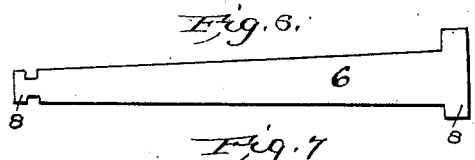
Attest
C. S. Middleton
L. B. Middleton
Inventor
Robert S. Wiesenfeld
by Ellis Spear
Atty

UNITED STATES PATENT OFFICE.

ROBERT S. WIESENFELD, OF BALTIMORE, MARYLAND.

SOFT-TREAD HORSESHOE.

SPECIFICATION forming part of Letters Patent No. 589,488, dated September 7, 1897.

Application filed December 29, 1896. Serial No. 617,361. (No model.)

*To all whom it may concern:*

Be it known that I, ROBERT S. WIESENFELD, a citizen of the United States, residing at Baltimore, in the State of Maryland, have invented certain new and useful Improvements in Horseshoes, of which the following is a specification, reference being had therein to the accompanying drawings.

My invention relates to horseshoes similar to those shown in the patent granted to Frederick W. Hahn, dated October 6, 1896, and numbered 569,009, wherein a rubber tread is provided for the shoe.

The invention relates more particularly to the means for retaining or clamping the rubber tread in the metallic shoe, whereby it may be renewed when worn without seriously impairing the clamping means and thus weakening the hold upon said tread.

It also relates to the calks and their manner of attachment to the shoe.

The invention is illustrated in the accompanying drawings, in which—

Figure 1 is a plan view of the shoe, showing the tread in position. Fig. 2 is a side elevation thereof. Fig. 3 is a section view on the line 1 1. Fig. 4 is a section view on the line 2 2. Fig. 5 is a detail perspective view; Figs. 6, 7, and 8, detail views of the fastening-band, a portion of the rubber tread, and a part of the shoe-body, respectively.

The shoe proper is made, as usual, of metal adapted to be drawn and fitted to the horse's hoof. This shoe has a groove 1, formed by the side walls 2 2, which extend from the base 3. The rubber tread 3', of tubular form, which fits snugly within the groove 1, has heretofore been clamped in place by a series of fingers or points which are formed integral with the walls 2 2 and are pressed against said tread when heated during the fitting of the shoe. To remove the tread when worn, it is necessary to bend these points back, which of course weakens and in time breaks the same off, and thus makes a new pair of shoes necessary while the old pair are not worn with the exception of the tread and points. To overcome this objection, I provide a series of fasteners independent of the shoe proper, which may be readily replaced when the tread is renewed, thus prolonging the life of the shoe.

The tread 3' is provided with a series of circumferential grooves 5, in which the bands 6 6 rest. The bands are threaded through alining openings 7 7 in the walls 2 2 and passed beneath the tread 3', the free ends of said bands being pressed into said grooves 5. In making these bands they are preferably tapered, as shown in Fig. 6, so that they may be readily threaded through the openings 7 7, and provided with the T-shaped heads 8 8, which fit within a recess formed in the upper face of the tread 3', contiguous to the recesses 5. The bands being thus held in the grooves below the surface of the tread 3' do not contact with the ground and are subjected to little or no wear.

To assist the bands in retaining the tread in place, I provide a series of projections with T-shaped heads, which extend upwardly from the edges of the walls 2 2. The walls are then slit a short distance in line with the side edges of the shanks of these projections to permit the said projections to give when they are pressed into the grooves 5. The heads of these projections fit into recesses contiguous to the grooves 5. These projections are adapted to be used in connection with the before-described bands when the shoe is first fitted, but the bands are designed to be used independently after the projections have become weakened and broken off from the continuous insertion of a new tread. The bands are passed over these projections when they are used, and to provide an unbroken even side to the walls 2 2 said walls are recessed at 8' to form a seat for the bands.

To prevent the tread from creeping in the groove 1, the bottom thereof is roughened, preferably, as shown in Fig. 8, by running a series of ribs diagonally across the bottom, which may interlock with corresponding grooves in the tread.

The calks, which are removable, are attached in a novel manner. The front of the shoe has a dovetail countersunk part $b$ and a cut-out part $c$, which is as deep as the groove 1. The front calk $d$ is dovetailed on its sides to fit into the dovetail recess in the shoes and is provided with a shoulder, which is snugly seated on the countersunk part $b$, and a tailpiece, which fits the cut-out part $c$. Binding-screws $e$ enter through the front wall of the shoe into the tailpiece and firmly hold the calk in place. It will thus be seen that the pressure and jar received by this calk will only tend to press it more firmly in place and there will be no liability of its working loose.

The ends of the groove 1 are walled, and the calks $g$ are provided with shouldered portions which rest on the top of said walls, and tailpieces extending down between the same and the ends of the tread 3'. Binding-screws $h$ are then passed through the said walls into said tailpieces.

I claim—

1. In combination, the shoe, the grooved tread, and the band for retaining said tread in position and having its ends held in said groove in said tread, substantially as described.

2. In combination, a horseshoe having a groove formed by the walls 2 2, said walls having alining openings therein, the tread having concentric grooves, and the bands adapted to be threaded through said openings and beneath said tread and adapted to have their free ends held in said concentric grooves, substantially as described.

3. In combination, the tread having concentric grooves, the shoes having the grooves therein formed by the walls 2 2, said walls having alining openings, the projections extending upwardly from said walls, said walls having slits in line with the sides of said projections whereby said projections may be pressed into the grooves in said tread, and the independent bands adapted to be threaded through the opening in said side walls and beneath said tread, said bands being adapted to be passed over said projections and have their free ends held centrally in said concentric grooves, substantially as described.

4. In combination, the shoe having a groove with end walls and a tread inserted in said groove, the calks having the shoulders resting on the top of said end walls, and the tailpieces depending between the ends of said tread and the end walls and resting against said walls, and the binding-screws extending through said walls into said tailpieces, substantially as described.

In testimony whereof I affix my signature in presence of two witnesses.

ROBERT S. WIESENFELD.

Witnesses:
HENRY E. COOPER,
F. L. MIDDLETON.